(12) United States Patent
Krause et al.

(10) Patent No.: US 8,306,560 B2
(45) Date of Patent: *Nov. 6, 2012

(54) METHOD AND SYSTEM FOR CONFIGURING A TELEMATICS DEVICE USING TWO-WAY DATA MESSAGING

(75) Inventors: Kevin R. Krause, Plymouth, MI (US); Ki-Hak Yi, Windsor (CA); Elizabeth Chesnutt, Troy, MI (US)

(73) Assignee: General Motors LLC, Detroit, MI (US)

( * ) Notice: Subject to any disclaimer, the term of this patent is extended or adjusted under 35 U.S.C. 154(b) by 1361 days.

This patent is subject to a terminal disclaimer.

(21) Appl. No.: 11/864,248

(22) Filed: Sep. 28, 2007

(65) Prior Publication Data

US 2009/0088187 A1  Apr. 2, 2009

(51) Int. Cl.
*H04W 4/00* (2009.01)
*H04M 1/725* (2006.01)

(52) U.S. Cl. .................... 455/466; 455/412.1

(58) Field of Classification Search ............ 455/404.1, 455/456.1, 557, 412.1, 426.1, 403, 425, 415, 455/67.11, 410, 418, 414.1, 411, 456.3; 701/209, 701/32.4, 414, 33; 370/290, 252, 286, 389; 379/37, 265.01

See application file for complete search history.

(56) References Cited

U.S. PATENT DOCUMENTS

| | | | |
|---|---|---|---|
| 6,282,491 B1 * | 8/2001 | Bochmann et al. | ........... 701/209 |
| 6,748,211 B1 | 6/2004 | Isaac et al. | |
| 2004/0023647 A1 | 2/2004 | Mazzara, Jr. et al. | |
| 2004/0138790 A1 | 7/2004 | Kapolka et al. | |
| 2004/0180647 A1 | 9/2004 | Schwinke et al. | |
| 2004/0259524 A1 | 12/2004 | Watkins et al. | |
| 2005/0017851 A1 | 1/2005 | Allison | |
| 2005/0027438 A1 | 2/2005 | Rockett et al. | |
| 2005/0080606 A1 | 4/2005 | Ampunan et al. | |
| 2005/0201545 A1 | 9/2005 | Rockett et al. | |
| 2006/0030298 A1 | 2/2006 | Burton et al. | |

(Continued)

FOREIGN PATENT DOCUMENTS

CN   1859182 A   11/2006

(Continued)

OTHER PUBLICATIONS

Rohini P.P. Gemplus Technologies, Over-The-Air Provisioning in CDMA, Oct. 2004.

(Continued)

*Primary Examiner* — Kiet Doan
(74) *Attorney, Agent, or Firm* — Leydig, Voit & Mayer, Ltd.

(57) ABSTRACT

A method and system for configuring a telematics device is constructed so as to use two-way short message service (SMS) to provide improved configuration execution. Mobile identification number (MIN), Mobile Directory Number (MDH), Home System Identification (SID) number, SID/NID pairs, NAI/password for packet data, over the air service provisioning (OTASP) number, and Preferred Roaming List (PRL) flag can be easily updated with no manual or voice channel configuration actions. In addition, other system settings such as button behavior, language, call barring, adding units to hands-free calling, etc. may be updated as well. In an example, a series of binary SMS messages configures the telematics device, with a subset of the messages being used specifically for configuration while the remaining message initiates a packet data session to complete additional configuration.

20 Claims, 4 Drawing Sheets

U.S. PATENT DOCUMENTS

| | | |
|---|---|---|
| 2007/0027614 A1 | 2/2007 | Reeser et al. |
| 2007/0082679 A1* | 4/2007 | Kim et al. .................. 455/456.1 |
| 2007/0093947 A1 | 4/2007 | Gould et al. |
| 2007/0142028 A1* | 6/2007 | Ayoub et al. ............... 455/404.1 |
| 2007/0155368 A1* | 7/2007 | Phelan ....................... 455/412.1 |

FOREIGN PATENT DOCUMENTS

| | | |
|---|---|---|
| DE | 103 29 871 A1 | 1/2005 |

OTHER PUBLICATIONS

English Summary first Office Action dated Mar. 3, 2011 by Chinese Patent Office for Chinese Application No. 200810168760.8.

Office action for German Patent Application No. 10 2008 048 466.0 dated Aug. 30, 2011.

* cited by examiner

METHOD AND SYSTEM FOR CONFIGURING A TELEMATICS DEVICE USING TWO-WAY DATA MESSAGING

FIELD OF THE INVENTION

This invention relates generally to configuring a communications device using mobile phone data messaging and more particularly to configuring a telematics unit in a mobile vehicle via two-way SMS.

BACKGROUND OF THE INVENTION

One of the fastest growing areas of communications technology is related to automobile network solutions. In coming years, most new American cars will have some level of telematics service, and with the increasing number and variety of these services, demands on telematics service call centers will also grow.

Typically, each telematics device must be configured upon receipt of a customer delivery record when the vehicle is sold. This configuration includes assigning and programming a local phone number as well as setting other device specific parameters. Currently, the configuration process relies on either manual entry of configuration parameters or configuration by circuit switched data via a cellular voice channel to send/receive parameters from the data center to the telematics unit (i.e. modem-to-modem communication). However, these methods can be time-consuming, resource-intensive, and costly due to airtime and system utilization time. Therefore, there continues to be an unmet need to lower telematics device configuration costs and increase efficiency of configuration.

BRIEF SUMMARY OF THE INVENTION

Examples of the invention provide a method and system for configuring a telematics device using two-way short message service (SMS). In one example, a number assignment module (NAM) updates parameters that include the mobile identification number (MIN), Mobile Directory Number (MDN), System Identification (SID) number, SID/NID (Network Identifier) pairs, NAI (Network Access Identifier)/password for packet data, over the air service provisioning (OTASP) number, and Preferred Roaming List (PRL) flag. In addition, other system settings such as button behavior, language settings, call barring, adding units to hands-free calling, etc. may be updated. A series of binary SMS messages configures the telematics device in an example. In a particular example, certain of these binary SMS messages are themselves used for configuration while others initiate a packet data session to execute additional configuration.

DETAILED DESCRIPTION OF THE INVENTION

Before describing the invention in detail, an exemplary environment in which the invention can be operated will be described. It will be appreciated that the environment of FIG. 1 is described for purposes of illustration only, and this example does not imply any limitation regarding the use of other environments to practice the invention.

Figure 1:
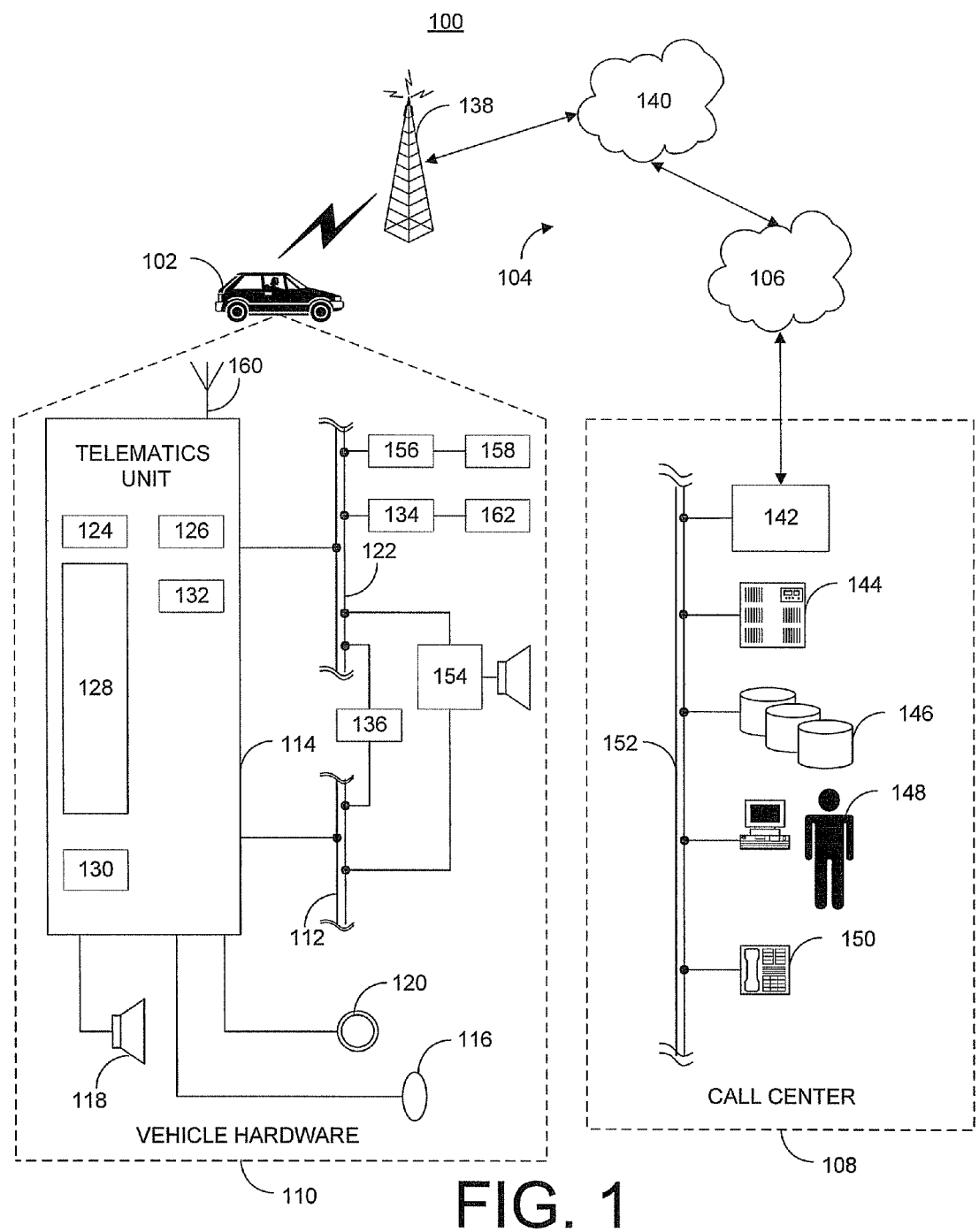
FIG. 1 is a schematic view of an example communication system within which the present invention optionally may be implemented.

With reference to FIG. 1 there is shown an example of a communication system 100 that may be used with the present method. The example communication system 100 generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotaimnent-related services where music, Web pages, movies, television programs, videogames and/or other content is downloaded by an infotaimnent center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push-button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. [A component in the mobile switching center may include a remote data server (not shown). (180 is not present in FIG. 1).] As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

Call Center (CC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. In an example, database 146 contains data to be formatted for an SMS message. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Examples of the invention are designed to configure telematics devices such as device 114 using two-way data messaging. Although these examples are described using short message service (SMS) technology, the invention is not limited to SMS technology but is able to accommodate in specific implementations any data messaging technology including but not limited to text messaging, instant messaging, image messaging, or any other data transfer and configuration technology.

The process according to an example updates number assignment module (NAM) parameters as well as the NAI/password, OTASP number, and sets the outdated preferred roaming list (PRL) flag. The NAM may be an Erasable Programmable Read-Only Memory (EPROM) in a mobile telephone that holds information such as the mobile identification number (MIN), the mobile directory number (MDN), and the home system identification number (SID)/network identification number (NID) pair. Of note, cellular fraud in a wireless carrier system often involves modifying the information stored in the NAM. Thus, it is important for the call center 108 to configure and control these NAM parameters.

A telematics unit 114 contains a cellular device 124. A digital wireless telephony cellular device is typically shipped without a mobile identification number (MIN). However, the MIN is required for a local wireless telephony service provider to properly address a handset and for the mobile unit to register on the system in the home region or while roaming. Ordinarily, upon delivery and setup, the MIN is downloaded into the handset using over-the-air service provisioning (OTASP). Thus, the wireless telephony service provider must typically configure the mobile unit and the cellular network so that the mobile unit may be accessed using OTASP. If a phone is to be programmed without OTASP, then the configuration must be carried out manually. Manual configuration, however, requires knowledge on the part of the consumer or vendor representative to be able to manipulate the device. Moreover, manual configuration requires knowledge of the proper parameter values to program the device and to communicate with the wireless service provider for assigning appropriate MINs and MDNs (mobile directory numbers). In any case, when the vehicle is not in an OTASP-enabled region during the setup, configuration of the system may need to be completed after the vehicle enters an OTASP-enabled region. A MIN identifies a mobile unit within a wireless carrier's network. The MIN often can be dialed from other wireless or wireline networks. The number differs from the electronic serial number (ESN), which is the unit number assigned by a phone manufacturer. In another example, an MEID (Mobile Equipment Identity) may be used in lieu of an ESN.

The MDN is the phone number dialed to reach a specific cellular device. Prior to wireless number portability, the MDN was the same number as the MIN for many cellular devices. However, currently MDN numbers can be ported to other carriers, such that an MDN and MIN will be different for cellular phones with ported numbers.

On cellular networks, a SID is a 15-bit number transmitted by every AMPS, N-AMPS, and CDMA base station to identify a portion of a carrier's network. Reception of the transmitted SID allows a telematics unit 114 to determine whether the unit 114 is located in its home service area, or in a roaming area, and consequently to determine its current geographic location.

A SID/NID pair generally comprises two numbers that uniquely identify the location of a cellular device within a wireless carrier system. In the present application, a wireless carrier system the base stations associated with the system. In contrast, a network is a subset of the base stations which comprise a carrier system. For example, a network may comprise the Base Transceiver Stations (BTSs) controlled by a given Centralized Base Station Controller (CBSC).

In addition to updating NAM parameters, the NAI/password, OTASP number, and PRL flag may also be updated. For example, a cellular device may have a network access identifier (NAI) and password to authenticate itself to the wireless network for sending packet data. A wireless service provider may have an Over-The-Air Service Provisioning (OTASP) number, which is a number that a new purchaser of a cellular device calls to receive service from a wireless service provider. The call origination scheme for such calls is often different from the scheme for a conventional call. The service provider may have several OTASP numbers, to allow several new customers to sign up simultaneously. It is often convenient for each of these numbers to be associated only with the type "OTASP". This avoids the need for repeating, for every telephone number, every element of the call origination scheme associated with the OTASP type.

A PRL is a list contained within or associated with a cellular device identifying preferred roaming partners for a wireless carrier. Thus, when a cellular device roams (i.e., is transported outside of its home carrier service area), it will attempt to connect to carriers listed in the PRL. This list of carriers is periodically updated by the wireless carrier, and an outdated PRL flag indicates that the list may need to be updated.

As noted above, in addition to the NAM parameters, other specific settings or behaviors on the telematics unit 114 can be updated, such as changing the button behavior of the unit, setting the language, disabling call barring, adding units for hands-free calling, etc.

An example using two-way SMS to configure the cellular device within a telematics unit 114 uses a series of binary SMS messages sent between the call center 108 and the telematics unit 114. Each message is one of (1) mobile-terminated (MT) set/request and (2) mobile-originated (MO) responses. In the described example, a total of five SMS messages are used. Four are used specifically for the configuration of the device 114 and the fifth is used to initiate a packet data session to complete additional configuration if required. Although this example lists certain details such as call number and type, it will be appreciated that the invention is not limited, e.g., to configuring the telematics unit 114 via five SMS messages. Thus, other examples and implementations may use a different number of SMS messages for configuration.

As noted above, a configuration process for a telematics unit traditionally relies on either manual entry of configuration parameters or configuration by circuit switched data via a cellular voice channel to send/receive parameters from the call center 108 to the telematics unit 114 (i.e., modem-to-modem communication). However, there has been a long felt unmet need to improve the speed and efficiency of telematics unit configuration.

Figure 2:
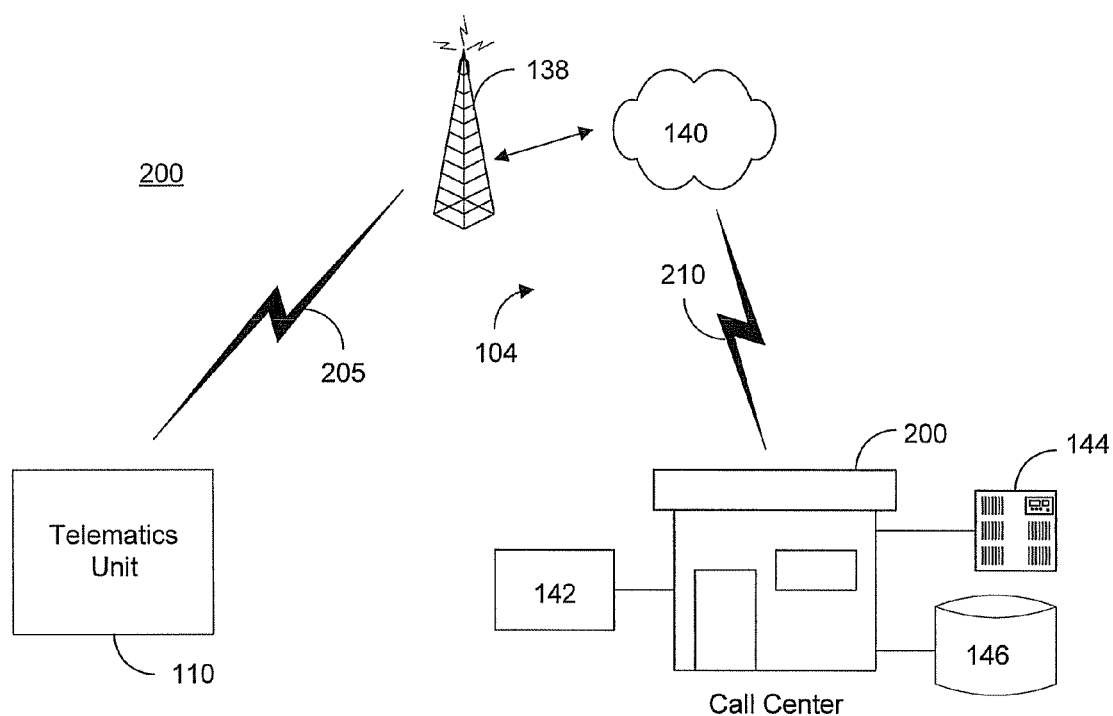
FIG. 2 is an architectural overview diagram of a system according to an example implementation.

FIG. 2 illustrates an exemplary system 200 for configuring a telematics unit using two-way SMS. In particular, the call center 108 may configure the cellular device 124 within the telematics unit 114 using two-way SMS via one or more switches 142, servers 144, and databases 146. The SMS messages flow between the call and the telematics unit 114 through the wireless carrier system 104. More specifically, SMS messages travel through communication links (205, 210), cell towers 138, base stations and mobile switching centers (MSCs) 140.

Figure 3:
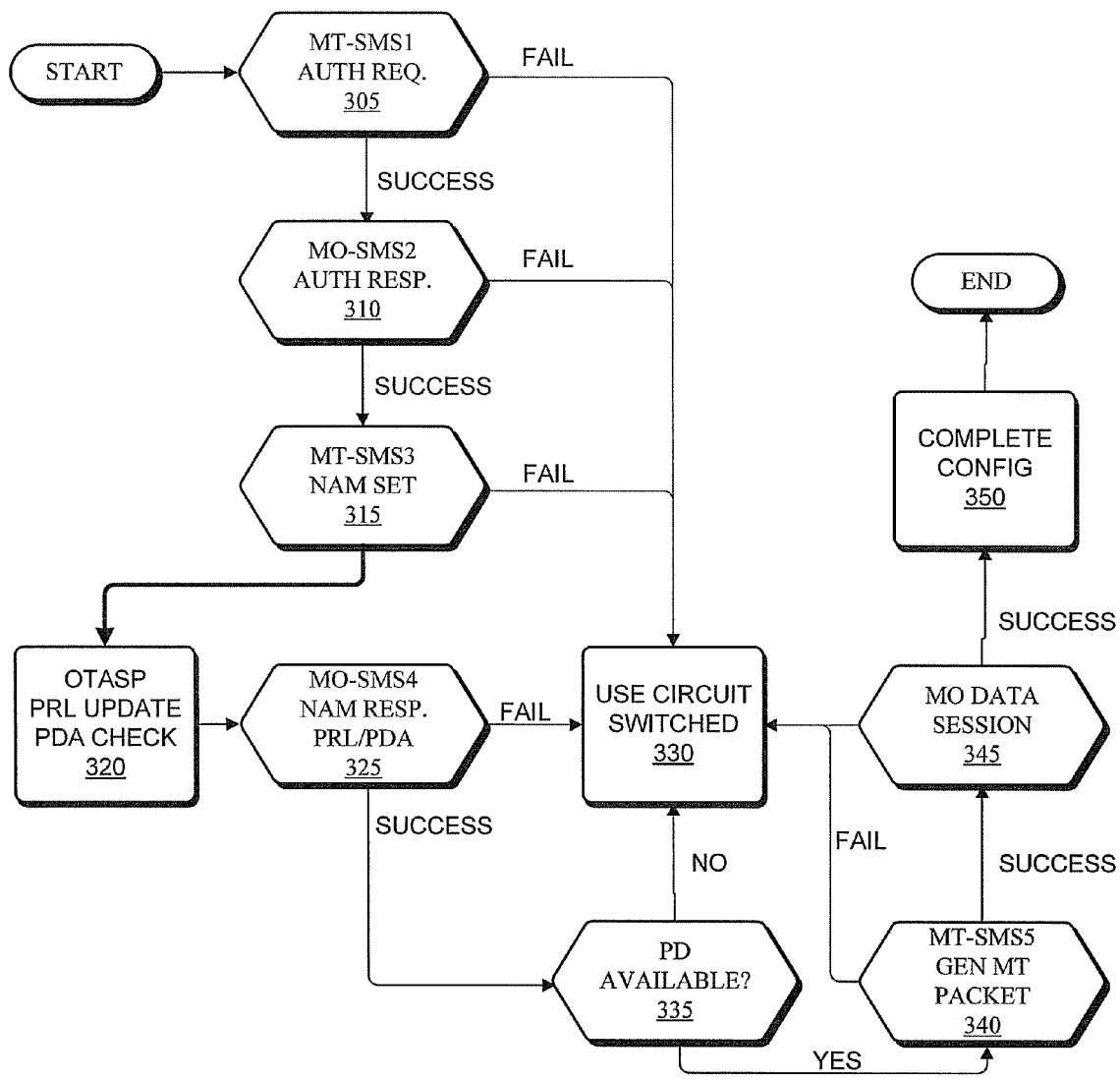
FIG. 3 is a flow diagram illustrating a method of configuring a telematics unit using two-way data messaging in accordance with an exemplary implementation.

FIG. 3 is a flow diagram 300 illustrating a method of configuring a telematics unit 114 using two-way SMS. At stage 305, the call center sends an SMS message to the telematics unit 114. The SMS message is a MT SMS Request that requests the telematics unit's electronic serial number (ESN), software version, and other pertinent parameters from the device, including the vehicle identification number (VID). The VID may contain, for example, additional information such as the vehicle 102 location, local packet data availability, and voice prompt language parameters (English, French, and the like). If the SMS message fails to reach the telematics unit 114, then the call center 108 uses a traditional voice, circuit switched channel to configure the telematics unit at stage 330. At stage 310, the telematics unit 114 sends a MO SMS Response sending the call center 108 the ESN, software version, and other pertinent parameters from the telematics unit 114. If the MO SMS Response message fails to reach the call center 108, then the telematics unit 114 uses a traditional voice, circuit switched channel to communicate with the call center at stage 330.

At stage 315, the call center 108 sends a MT SMS Set/Request configuring the MIN, MDN, Home SID, SID/NID pairs, and NAI/password for the telematics unit 114. If the a MT SMS Set/Request message fails to reach the telematics unit 114, then again the call center 108 uses a traditional voice, circuit switched channel to configure the telematics unit at stage 330. At stage 320, the call center 108 configures the OTASP number, updates the PRL flag, and checks the packet data availability (PDA) for the telematics unit 114. At stage 325, the telematics unit 114 sends a MO SMS Response providing information on whether or not the SET was successful, the PRL table version that was downloaded from the network, and the VID. If the MO SMS Response message fails to reach the call center 108 at stage 325, then the telematics unit 114 uses a traditional voice, circuit switched channel to communicate with the call center 330.

At stage 335, it is determined whether packet data transmission is available between the call center 108 and the telematics unit 114 through SMS. If packet data transmission is not available then the configuration continues using traditional, voice, circuit switched means. However, if packet data transmission is available, then the call center 108 sends a MT SMS message at stage 350 that initiates packet data session 345 to configure additional telematics parameters such as changing the button behavior, setting the language, disabling call barring, adding units for hands-free calling, etc. It should be noted that once the configuration process 300 starts using the traditional, voice, circuit switched means, subsequent steps in the method are preferably also executed using the voice, circuit switched means.

Figure 4:
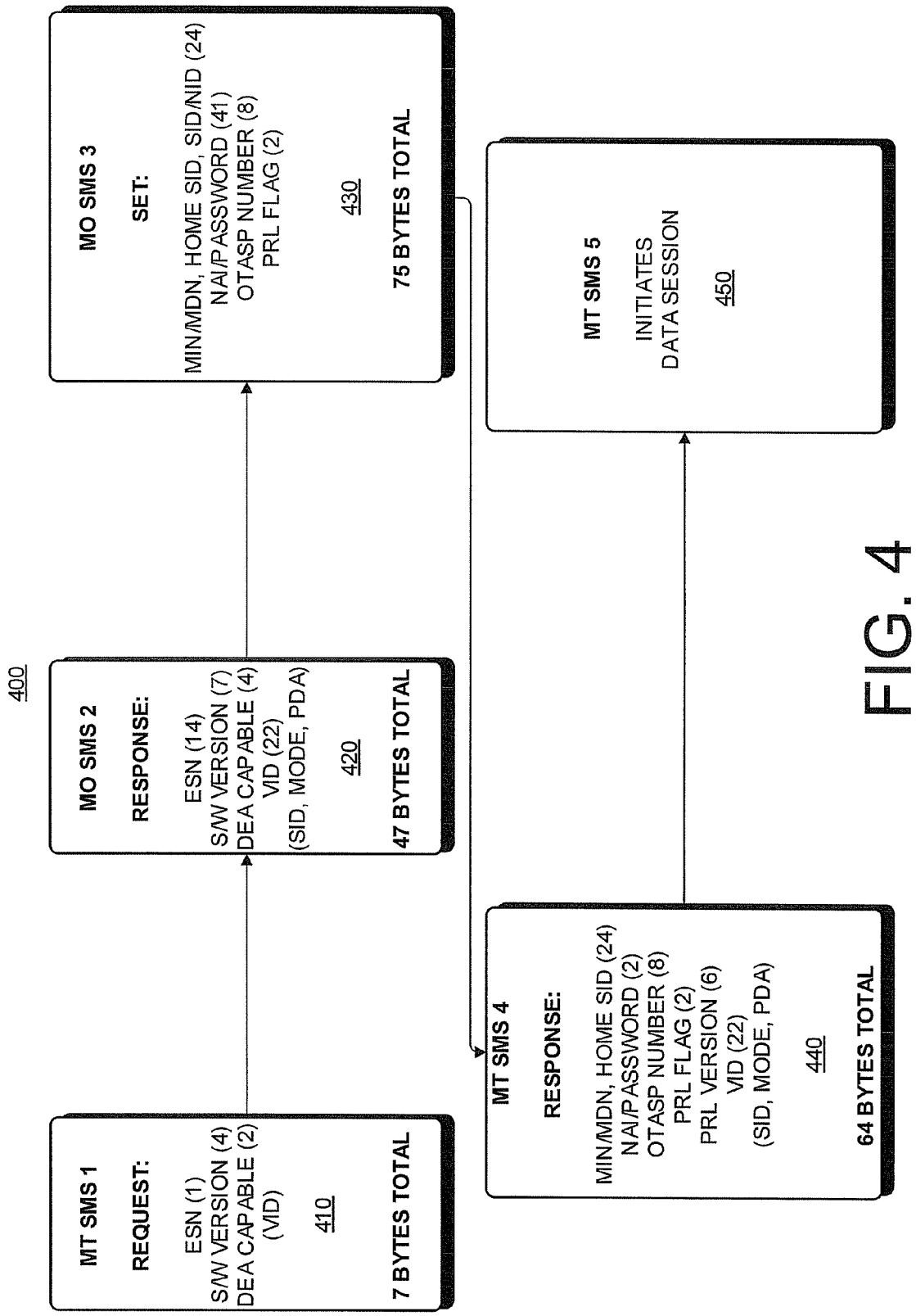
FIG. 4 is a data diagram illustrating exemplary data messages for configuring a telematics unit using two-way data messaging in accordance with an exemplary implementation.

FIG. 4 illustrates exemplary data messages for a method of configuring a telematics unit using two-way data messaging. FIG. 4 illustrates the type message (request, response, or set), the parameters contained within the message, and the size (e.g., in Bytes) of each parameter and message. The messages are shown using, but are not limited to, SMS technology. The first message, MT SMS 1 410, is a request originating from the call center 108 and sent to the telematics unit 114. In this message 410 the call center 108 requests the ESN in one byte, the software version in four bytes, and the DEA (Destination Entry Assist) capability in 2 bytes. In addition, it requests the VID. The overall size of the first message in the illustrated example is seven bytes.

The second message, MO SMS 2 420, comprises a response sent from the telematics unit 114 to the call center 108. In the illustrated example, the forty-seven byte message 420 contains the ESN in fourteen bytes, the software version in seven bytes, DEA capability in four bytes, and the VID in twenty-two bytes. In addition, the telematics unit 114 responds with the SID, mode, and PDA of the telematics unit 114. The third message, MT SMS 3, 430, sent from the call center 108, contains and sets parameters on the telematics unit 114 in the illustrated example. These parameters include the MIN, MDH, Home SID, and SID/NID pair in twenty-four bytes, the NAI/password in forty-one bytes, the OTASP number in eight bytes, and the PRL flag in two bytes. The overall length of the third message is seventy-five bytes in this example.

Continuing the example, the fourth message, MO SMS 4 440, is a response from the telematics unit 114 to the call center 108 that is sixty four bytes in length. The response 440 contains the MIN, MDN, and home SID in twenty-four bytes, the NAI/password in two bytes, the OTASP number in eight bytes, the PRL flag in two bytes, the PRL version in six bytes and the VID in twenty-two bytes. In addition the telematics unit 114 responds with the SID, mode, and PDA of the telematics unit 114. The fifth message, MT SMS 5 450, is sent from the call center 108 to the telematics unit 114 to initiate a data session to configure any additional parameters such as changing button behavior, setting language, disabling call barring, adding units for hands-free calling, etc.

Once the SMS messages 410-450 are exchanged, the telematics unit 114 has been configured by the call center 108 without the use of either manual configuration or configuration by circuit switched data via a cellular voice channel between the call center 108 and the telematics unit 114. Thus, this novel means of telematics device configuration overcomes the disadvantages of the prior art while facilitating efficient and accurate configuration of the telematics unit 114.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Certain examples of the invention are described herein, including the best mode known to the inventors for carrying out the invention. Variations of those examples will be apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for remotely configuring a telematics unit using two-way data messaging technology between a call center and a cellular device within the telematics unit comprising:
   requesting, at the call center, via two-way data messaging one or more values corresponding to one or more device parameters from the telematics unit;
   receiving at the call center from the telematics unit the one or more values corresponding to one or more device parameters via two-way data messaging; and
   transmitting via two-way data messaging from the call center to the telematics unit a configuration message, whereby configuration parameters initializing the telematics unit for provision of telematics services over a cellular network are set in response to receipt of the configuration message.

2. The method according to claim 1, wherein the configuration parameters of the telematics unit comprise one or more of an electronic serial number, a software version, a Destination Entry Assist (DEA) capability, a vehicle identification number, a packet data availability, a mobile identification number, a mobile directory number, a home system identification number, a system identification/network identification pair, a network access identifier/password pair, an over the air service provisioning number, and a Preferred Roaming List (PRL) outdated flag.

3. The method according to claim 1 further comprising:
initiating a packet data session between the call center and the cellular device of the telematics unit; and
transmitting and receiving data packets between the cellular device of the call center and the cellular device of the telematics unit.

4. The method according to claim 3 further comprising using a voice circuit switched channel between the call center and the cellular device of the telematics unit to complete configuration of the telematics unit when a packet data session is unavailable.

5. The method according to claim 1 further comprising using a voice circuit switched channel between the call center and the cellular device of the telematics unit to complete a configuration of the telematics unit when a two way messaging data message fails to reach its destination.

6. The method according to claim 1, wherein the two-way data messaging technology comprises one of text messaging, instant messaging, and image messaging.

7. The method according to claim 1, wherein the two-way data messaging technology comprises short message service.

8. A non-transitory computer-readable medium having thereon computer-executable instructions for executing a method of remotely configuring a telematics unit using two-way data messaging technology between a call center and a cellular device within the telematics unit, the computer-executable instructions comprising instructions for:
requesting via two-way data messaging one or more values corresponding to one or more device parameters at the call center from the telematics unit;
receiving at the call center from the telematics unit the one or more values corresponding to one or more device parameters via two-way data messaging; and
transmitting via two-way data messaging from the call center to the telematics unit a configuration message, whereby configuration parameters initializing the telematics unit for provision of telematics services over a cellular network are set in response to receipt of the configuration message.

9. The non-transitory computer-readable medium according to claim 8, wherein the configuration parameters of the telematics unit comprise one or more of an electronic serial number, a software version, a Destination Entry Assist (DEA) capability, a vehicle identification number, a packet data availability, a mobile identification number, a mobile directory number, a home system identification number, a system identification/network identification pair, a network access identifier/password pair, an over the air service provisioning number, and a Preferred Roaming List (PRL) outdated flag.

10. The non-transitory computer-readable medium according to claim 8, wherein the computer-executable instructions further comprise instructions for:
initiating a packet data session between the cellular device of the call center and the cellular device of the telematics unit; and
transmitting and receiving data packets between the cellular device of the call center and the cellular device of the telematics unit.

11. The non-transitory computer-readable medium according to claim 10, wherein the computer-executable instructions further comprise instructions for using a voice circuit switched channel between the call center and the cellular device of the telematics unit to complete configuration of the telematics unit when a packet data session is unavailable.

12. The non-transitory computer-readable medium according to claim 8 wherein the computer-executable instructions further comprise instructions for using a voice circuit switched channel between the call center and the cellular device of the telematics unit to complete a configuration of the telematics unit when a two way messaging data message fails to reach its destination.

13. The non-transitory computer-readable medium according to claim 8, wherein the two-way data messaging technology comprises one of text messaging, instant messaging, and image messaging.

14. The non-transitory computer-readable medium according to claim 8, wherein the two-way data messaging technology comprises short message service.

15. A system for configuring a telematics unit using two-way data messaging between a call center and a telematics unit comprising:
a call center apparatus that creates, formats, transmits, and receives data messages that configure parameters of the telematics unit;
a wireless data messaging network for sending data messages and data packets to configure parameters of the telematics unit; and
a cellular device associated with the telematics unit to transmit and receive data messages to configure parameters initializing the telematics unit;
wherein the cellular device contained within the telematics unit is configured to set the value of configuration parameters initializing the telematics unit for provision of telematics services over the wireless network based on data messages received over the wireless data messaging network from the call center apparatus;
wherein a call center apparatus comprises of one or more switches, servers, and databases to create and format data messages.

16. The system according to claim 15, wherein the configuration parameters of the telematics unit comprise one or more of an electronic serial number, a software version, a Destination Entry Assist (DEA) capability, a vehicle identification number, a packet data availability, a mobile identification number, a mobile directory number, a home system identification number, a system identification/network identification pair, a network access identifier/password pair, an over the air service provisioning number, and a Preferred Roaming List (PRL) outdated flag.

17. The system according to claim 15 wherein the cellular device located within the call center and the telematics unit transmit and receive packet data across a data messaging network.

18. The system according to claim 15 wherein the wireless data messaging network is capable of voice circuit switched channel communication between the cellular device of the call center and the cellular device of the telematics unit to complete configuration of the telematics unit when a data message fails to reach its destination.

19. The system according to claim 15 wherein the wireless data messaging network is capable of voice circuit switched channel communication between the cellular device of the call center and the cellular device of the telematics unit to complete configuration of the telematics unit when a packet data session is unavailable.

20. The system according to claim 15, wherein a data messaging technology in the wireless data messaging network is selected from the group consisting of text messaging, instant messaging, and image messaging.

* * * * *